Nov. 24, 1953     T. S. LASKY     2,660,314
OIL FILTER

Filed Jan. 13, 1950

Thomas S. Lasky
INVENTOR.

BY *Clarence A. O'Brien*
*and Harvey B. Jackson*
Attorneys

UNITED STATES PATENT OFFICE 2,660,314

OIL FILTER

Thomas S. Lasky, Kingston, Pa.

Application January 13, 1950, Serial No. 138,469

1 Claim. (Cl. 210—131)

This invention relates to oil filters such as are commonly used in connection with the lubricating systems of motor vehicles, and has more particular reference to an improved cartridge for such filters.

An object of the invention is to provide a simple and durable cartridge which consists of a cylindrical perforate shell, top and bottom closure disks removably fitted in the ends of said shell and having flanges engaging the end edges of the latter, said disks being provided with central openings and having recesses in their outer surfaces forming tapered washer seats about said openings, and a central intermediately perforated tube fixed at its lower end in the opening of the bottom disk and having the top disk removably threaded at its opening onto the upper end thereof. Thus, the cartridge embodies three separable parts which may be readily assembled or taken apart for cleaning and renewal of filtering material placed in the cartridge.

Figure 1:
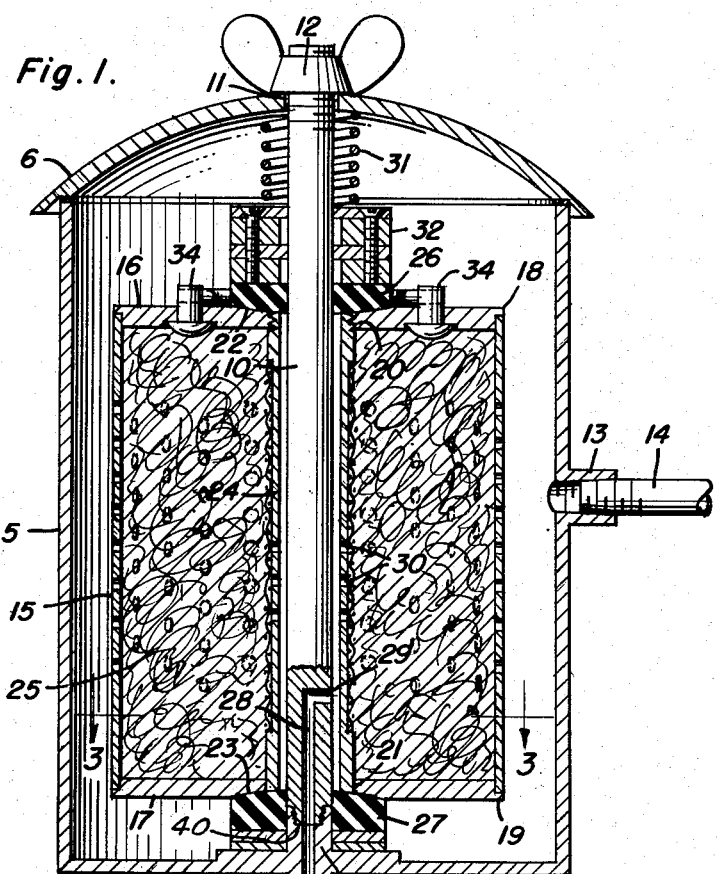
Figure 2:
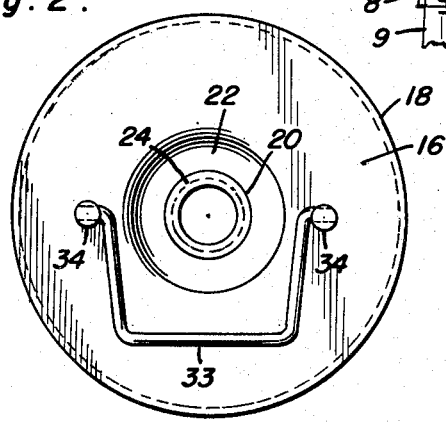
Figure 3:
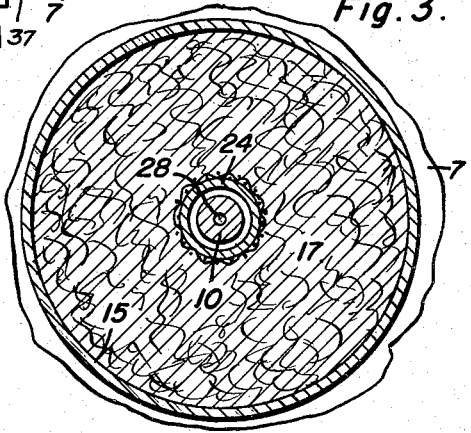

Other objects and features of the invention will become apparent from the following description when considered with the accompanying drawing, in which:

Figure 1 is a central vertical sectional view of a filter provided with a cartridge embodying the present invention, Figure 2 is a top plan view of the cartridge, and Figure 3 is a horizontal section taken on the line 3—3 of Figure 1.

Referring in detail to the drawing, 5 indicates the cup-shaped imperforate body of a cylindrical casing, and 6 the domed cover detachably secured on the top thereof. The bottom 7 of the casing body 5 has a central nipple 8 for connection with an oil conducting pipe 9. An internally threaded stub rod 37 is fixed centrally of the bottom 7 of the casing body 5 and a control rod 10 has a lower threaded extremity provided with an externally threaded projection 40 which is threadedly engaged in the stub rod 37, and this rod projects above the top of the body 5 and through a central opening 11 in the cover 6. A wing nut 12 is threaded on the upper end or rod 10 to removably secure the cover 6 on the body 5. The body 5 also has a side nipple 13 for connection with an oil conducting pipe 14.

Arranged within the casing is a cartridge including a perforate cylindrical shell 15, relatively thick top and bottom closure disks 16 and 17 removably fitted in the ends of the shell 15 and having flanges 18 and 19 engaging the end edges of said shell, said disks being provided with central openings 20 and 21 and having recesses in their outer surfaces forming tapered washer seats 22 and 23 about said openings, and a central tube 24 permanently fixed at its lower end in the opening 21 of the bottom disk 17 and having the top disk 16 removably threaded at its opening 20 onto the upper end thereof. Thus, the cartridge embodies three separable parts 15, 16 and 17, 24 which may be readily assembled or taken apart for cleaning and renewal of filtering material 25 placed in the cartridge. Tapered washers 26 and 27 are fitted on the rod 10 and engage the seats 22 and 23 to prevent escape of oil from the ends of tube 24 about the rod 10. The synthetic rubber washer 27 surrounds and seals the threaded joint between the stub rod 37 and the rod 10.

The lower end of rod 10 is provided with an axial passage 28, the lower end of which communicates with the bore of stub rod 37 and nipple 8 and the upper end of which communicates with a transverse passage 29 extending to the periphery of the rod. The tube 24 is provided intermediate its ends with perforations 30, and oil entering through either of the pipes 9 or 14 will pass through the filter to the other of said pipes.

The seat 23 is pressed against washer 27, and washer 26 is pressed against the seat 22 by means of a helical spring 31 disposed on rod 10 between the cover 6 and a combined oil seal and follower 32 slidably fitted on the rod 10 and disposed on the washer 26. This holds the cartridge centered in the casing with the tube 24 in spaced concentric relation to rod 10. The disk 16 is provided with a folding bail-like handle 33, pivoted at its ends in diametrically opposed posts 34 carried by said disk, to facilitate turning of said disk in threading it onto and off of the tube 24.

From the foregoing description, the construction, operation and advantages of the present invention will be apparent to those skilled in the art.

Having described the invention, what is claimed as new is:

In an oil filter, an open topped imperforate casing, an upstanding rod centrally disposed in the casing and rigidly attached at its lower end to the bottom of the casing, said rod being formed of separable upper and lower sections that are in threaded engagement, a cartridge including a cylindrical perforate shell, closure disks at the upper and lower ends of the shell, said disks being provided with central openings and having recesses in their outer surfaces forming tapered washer seats about said openings, a central perforated tube disposed in the openings in the disks, said tube surrounding the rod in spaced concentric relation thereto, upper and lower resilient sealing washers surrounding the upper and lower sections of the rod and engaging the seats, said rod having a passageway therein that opens laterally through the rod intermediate the washers, said passageway extending through the juncture of the upper and lower sections of the rod with the lower washer surrounding such juncture, a removable cover closing the top of the casing, and means carried by the upper section of the rod for holding the cover in closing position.

THOMAS S. LASKY.

References Cited in the file of this patent
UNITED STATES PATENTS

| Number | Name | Date |
|---|---|---|
| 2,110,009 | Weidenbacker | Mar. 1, 1938 |
| 2,275,481 | Wilkinson | Mar. 10, 1942 |
| 2,284,447 | Redner | May 26, 1942 |
| 2,342,948 | Long | Feb. 29, 1944 |
| 2,487,146 | Lasky | Nov. 8, 1949 |
| 2,601,404 | Lasky | June 24, 1952 |